United States Patent Office 3,780,028
Patented Dec. 18, 1973

3,780,028
DIPHENYLMETHYL 7β - (D - 2,2 - DIMETHYL-3-NITROSO - 5 - OXO - 4 - PHENYL-1-IMIDAZOLIDINYL)-3-METHYL-CEPHEM-4-CARBOXYLATE
Takayuki Naito, 4-24-19 Nishi-shinjuku Shinjuku-ku, Tokyo, Japan; Jun Okumura, 1-21-2-101 Utsukushigaoka, Midori-ku, Yokohama, Japan; and Hideaki Hoshi, 1-24-15 Minami, Meguroku, Tokyo, Japan
No Drawing. Filed July 26, 1972, Ser. No. 275,399
Int. Cl. C07d 99/24
U.S. Cl. 260—243 C      1 Claim

ABSTRACT OF THE DISCLOSURE

The antibacterial agent cephalexin is prepared from readily available hetacillin by the consecutive steps of nitrosation to give N-nitrosohetacillin, oxidation as with $NaIO_4$ below pH 5 to give the corresponding sulfoxide, conversion to its benzhydryl ester which is then rearranged by heat, preferably with a catalyst present, to give the benzhydryl ester of N-nitrosohetacephalexin, conversion to its free acid and finally cleavage to give cephalexin as by zinc and acetic acid or Raney nickel and hydrogen or, preferably, hydrogen chloride in dioxane.

BACKGROUND OF THE INVENTION (1) Field of the invention

This invention includes new processes for the production of the antibacterial agent cephalexin and certain novel chemical intermediates derived from hetacillin and used in those processes.

(2) Description of the prior art

Applicants' starting material, hetacillin, is a well-known antibacterial agent derived from 6-aminopenicillanic acid (6-APA) and described, for example, in U.S. Pat. 3,198,804, and J. Org. Chem., 31, 897 (1966). Applicants' final product, cephalexin, is an antibacterial agent derived from 7-desacetoxycephalosporanic acid (7-ADCA) and described, for example, in J. Med. Chem., 12, 310–313 (1969), in Great Britain 1,174,335, in South Africa 67/1,260 (Farmdoc 28, 654), in Japan 16,871/66 (Farmdoc 23,231), in Belgium 696,026 (Farmdoc 29,494) and in U.S. 3,507,861.

The conversion of a penicillin sulfoxide ester (by heating in presence of a strong acid) to the corresponding ester of a similarly N-acylated derivative of 7-ADCA has been reported in U.S. Pat. 3,275,626 and in J. Amer. Chem. Soc., 85, 1896 and 91 (6), 1401–1407 (1969). Variations of this process are given in Netherlands 6806532 (Farmdoc 34,685) and Netherlands 6806533 (Farmdoc 34,686). In those patents the side-chain is usually that of a fermentable penicillin such as penicillin G or V (although see column 7 of U.S. Pat. 3,275,626) and the product is an ester which must be cleaved, as by hydrogenation, to produce the active, free acid form of the final derivative of 7-ADCA. Great Britain 1,174,335 in Example 3 describes the application of this "sulfoxide rearrangement" to an ester of ampicillin sulfoxide in which the α-amino group is also blocked, that is, 6-[N-(2,2,2-trichloroethylcarbonyl - D - α - amino - α - phenylacetamido]-penicillanic acid sulfoxide 2,2,2-trichloroethyl ester, by heating and then use of zinc and acetic acid to remove the two blocking groups and thus produce cephalexin.

The art contains numerous additional descriptions of penicillin sulfoxides and their preparation, as described for example, by Chow et al., J. Org. Chem., 27, 1381 (1962), by Guddal et al., Tetrahedron Letters No. 9, 381 (1962), by Essery et al., J. Org. Chem., 30, 4388 (1965) who included ampicillin sulfoxide, and in U.S. Pat. 3,197,466.

The reaction product of acetone with cephaloglycin, but not with cephalexin, is described in U.S. Pat. 3,303,193. The reaction with acetone of certain ring-substituted cephalexins is described in general terms in U.S. Pats. 3,489,750, 3,489,751 and 3,489,752.

Deficiencies of these processes when applied to the production of cephalexin include the need to conduct a series of reactions to replace the original side-chain when a fermented penicillin, e.g., penicillin V, is used as the starting material, and the need when starting with the desired side-chain (α-aminobenzyl) to first introduce and later remove blocking groups for both the α-amino group and the carboxyl group.

Bristol-Myers Belgium 765,596 (Farmdoc 67,511S) describes intermediates (I, II, III and IV below) which may be summarized as follows:

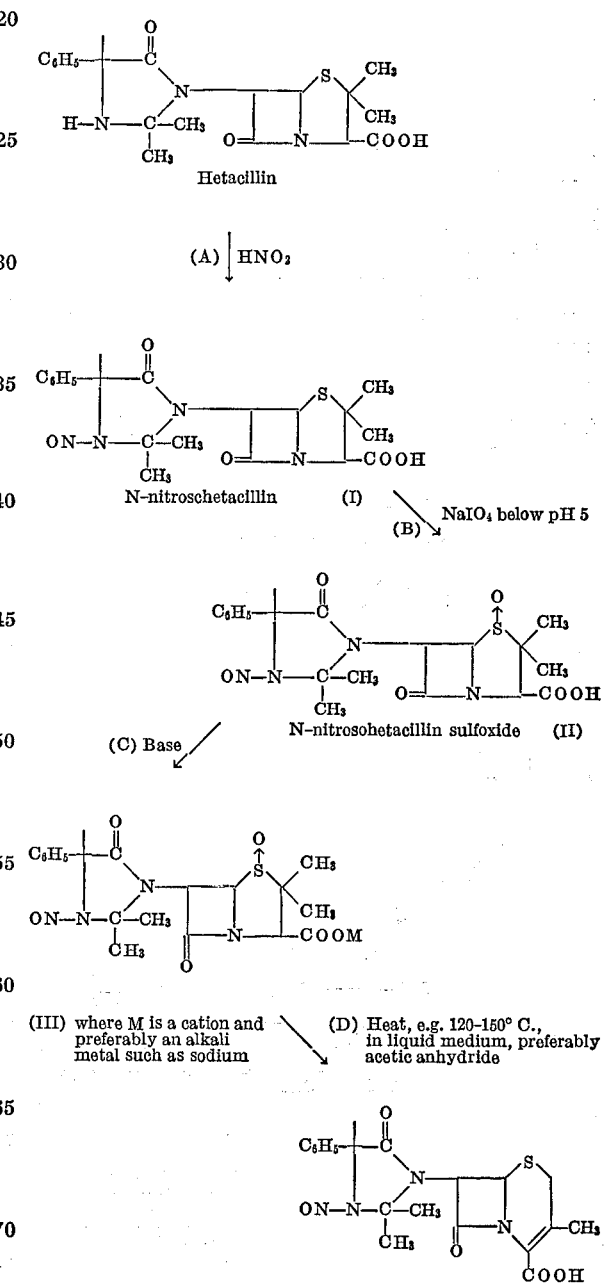

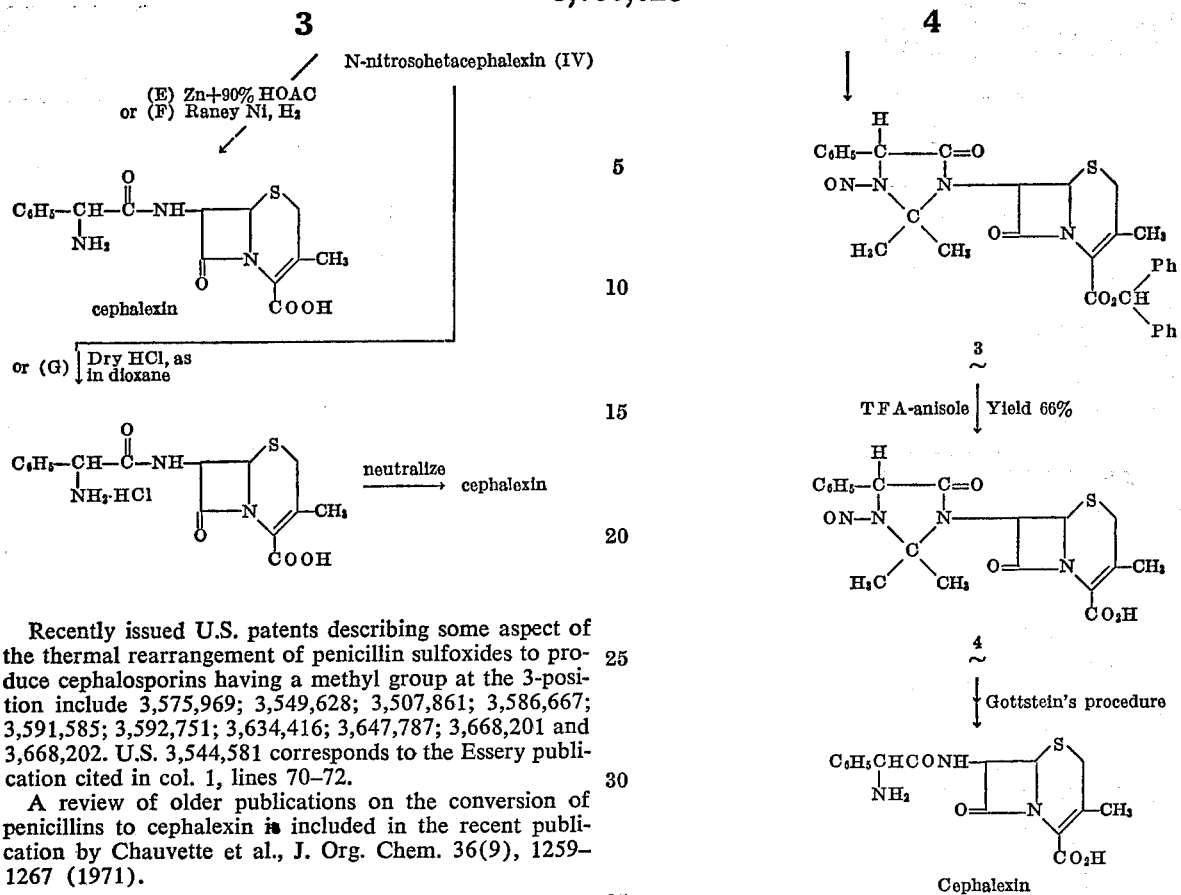

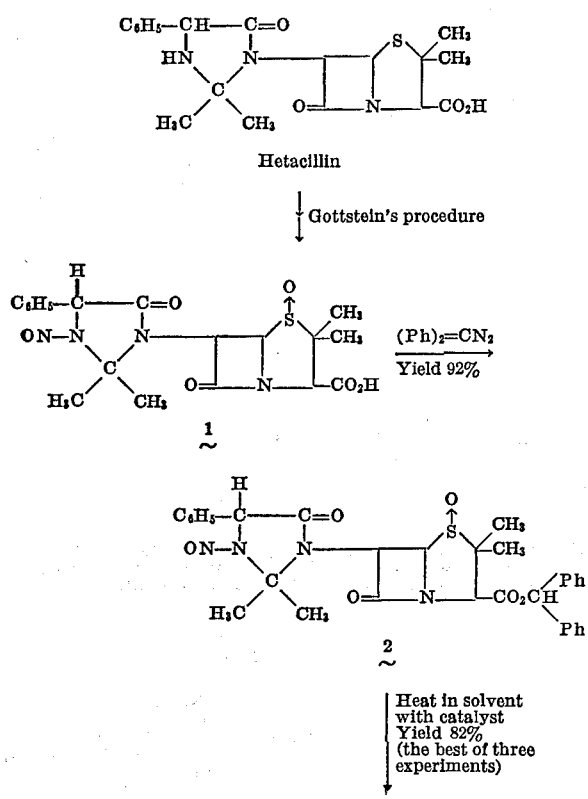

Recently issued U.S. patents describing some aspect of the thermal rearrangement of penicillin sulfoxides to produce cephalosporins having a methyl group at the 3-position include 3,575,969; 3,549,628; 3,507,861; 3,586,667; 3,591,585; 3,592,751; 3,634,416; 3,647,787; 3,668,201 and 3,668,202. U.S. 3,544,581 corresponds to the Essery publication cited in col. 1, lines 70–72.

A review of older publications on the conversion of penicillins to cephalexin is included in the recent publication by Chauvette et al., J. Org. Chem. 36(9), 1259–1267 (1971).

SUMMARY OF THE INVENTION

The present invention includes, but is not limited to, the novel intermediates 2 and 3 below and processes for their preparation and for conversion of the ester 3 to the free acid 4.

The references herein to "Gottstein's procedure" refer to the processes and intermediates described by Gottstein et al. in Bristol-Myers Belgium 765,596 (Farmdoc 67,-511S) and in J. Org. Chem. (in press, scheduled to be published in October 1972).

DETAILED DESCRIPTION

An embodiment of the present invention is the process of preparing diphenylmethyl 7β-(D-2,2-dimethyl-3-nitroso-5-oxo-4-phenyl-1-imidazolidinyl)-3-methyl-3-cephem-4-carboxylate by heating diphenylmethyl 6β-(D-2,2-dimethyl-3-nitroso-5-oxo-4-phenyl-1-imidazolidinyl)-penicillanate sulfoxide in a weakly basic organic solvent, such as dioxane or diglyme, in the presence of a nitrogen base having a pKb of not less than 4, and an acid, which will form salts or complexes, which salt may be formed in situ in the reaction mixture. The acid should preferably be a polybasic, for example, an organic acid such as a phosphonic or phosphoric acid.

The phosphorous containing acid may be orthophosphoric, polyphosphoric, pyrophosphoric or phosphorous acid or it may be a phosphonic acid. The phosphonic acid may be an aliphatic, araliphatic or aryl phosphonic acid; the aliphatic, araliphatic or aryl group of such a phosphonic acid may be a hydrocarbon group (e.g. a lower alkyl, phenyl lower alkyl or phenyl group) or a hydrocarbon group substituted by, for example, a halogen atom or a nitro group. Examples of aliphatic phosphonic acids include the lower alkyl and substituted (e.g., halogeno) lower alkyl phosphonic acids such as methane phosphonic acid, ethane phosphonic acid, dichloromethane phosphonic acid, trichloromethane phosphonic acid and iodomethane phosphonic acid. Examples of aryl phosphonic acids include the benzene and substituted (e.g. halogeno or nitro) benzene phosphonic acids, e.g., bromobenzene phosphonic acids and nitro-benzenephosphonic acids.

The expression "nitrogen base" is used herein as a convenient expression for a basic substance containing nitrogen although it may include other hetero atoms, e.g., oxygen. We prefer, however, to use weakly basic organic amines. Bases which may be used have a pKb for protonation of not less than 4 (i.e., as measured in water at 25° C.). The base may be a polyfunctional base having a nitrogen function with such a pKb for the first protonation step. The bases preferably have a pKb in water of not less than 7.

The organic base may be primary, secondary or tertiary; however, we prefer to employ weak tertiary organic bases. Illustrative of such tertiary organic bases are the unsaturated heterocyclic bases such as pyridine, quinoline, isoquinoline, benzimidazole and homologues thereof, for example the alkyl substituted pyridines and quinolines such as α-, β- and γ-picolines and 2- and 4-methylquinolines. Other substituted heterocyclic bases which may be used include those substituted by halogen (e.g. chlorine or bromine), acyl (e.g. formyl or acetyl), acylamido (e.g. acetamido), cyano, carboxy, aldoximino and the like.

Other organic bases which may be used include aniline and nuclear substituted anilines such as halogeno anilines (e.g. o-chloroaniline, m-chloroaniline and p-chloroaniline); anilines (e.g. o-methylaniline and m-methylaniline); hydroxy- and (lower)alkoxyanilines (e.g. o-methoxyaniline and m-hydroxyaniline); nitroanilines (e.g. m-nitroaniline) and carboxyanilines (e.g. m-carboxyaniline) as well as N-(lower)alkyl anilines (e.g. N-methylaniline) and N,N-di(lower)alkyl anilines.

Preferred classes of catalytic systems are those obtained by the reaction of a phosphorus containing acid with a nitrogen base. Advantageous results have been obtained in the process according to the invention when salts of orthophosphoric are employed as catalysts. However, equally advantageous results are obtained when the catalyst is generated in situ. Catalyst systems are obtained by reacting substantially molar equivalents of an acid with an aromatic heterocyclic tertiary organic nitrogen base in a weakly basic solvent system. Advantageous results are obtained in the process according to the invention when complexes of pyridine, quinoline, isoquinoline or derivatives thereof substituted with lower alkyl, halogen, acyl, acylamido, cyano, carboxy, or aldoximino, are employed as catalysts.

Particularly preferred complexes of nitrogen bases are those obtained by reaction of a phosphorus containing acid with an aromatic heterocyclic, tertiary organic nitrogen base. Advantageous results have been obtained in the process according to the invention when salts of orthophosphoric or a phosphonic acid with pyridine, quinoline, isoquinoline, or such bases substituted by, for example, lower alkyl, halogen, acyl, acylamido, cyano, carboxy, or aldoximino are employed. Thus useful catalysts include pyridine; 2-methyl- and 4-methyl-pyridine; quinoline and isoquinoline salts of orthophosphoric, methane phosphonic, ethane phosphonic, iodomethane phosphonic, dichloromethane phosphonic, trichloromethane phosphonic, bromobenzene phosphonic and nitrobenzene phosphonic acids.

The catalytic system used in the process according to the invention may be derived from proportions of the acid and the base such that one or more of the acidic function(s) are partially neutralized by the base and solvent. Generally, a less than molar quantity of nitrogen base is employed so that, in addition to the salt, the catalyst also comprises some free acid.

The optimal ratio of acid: base catalytic system will depend on various factors including the nature of the acid and the base as well as the nature of the penicillanic acid sulfoxide. The optimal ratio may be ascertained by preliminary trial and experiment.

One preferred catalytic system for use in the process according to the invention is that obtained by the reaction of 1 mole of pyridine and 2 moles of orthophosphoric acid in dioxane.

Another preferred catalytic system for use in the process according to the invention is formed from quinoline and orthophosphoric acid in a weakly basic solvent (i.e., dioxane). This is obtained by reaction of substantially one molar equivalent of quinoline and two molar equivalents of orthophosphoric acid.

The process according to the invention is preferably carried out in a weakly basic organic solvent to regulate acidity, homogeniety and temperature. Ordinarily, the penicillanic acid sulfoxide will be in a solution in the organic solvent. The solvent should be substantially inert to the penicillanic acid sulfoxide used in the process and to the 3-methylceph-3-em-4-carboxylic acid produced by the process.

Solvents which may be used include those described in U.S. Pat. No. 3,275,626 and other publications describing the rearrangement reaction. However, particularly suitable solvents include ketones boiling at from 75–120° C. (e.g. 100–120° C.), esters boiling at from 75–140° C. (e.g. 100–130° C., dioxane and diethylene glycol dimethyl ether (diglyme). Illustrative of those ketones and esters that may be used in the process according to the invention are aliphatic ketones and esters having appropriate boiling points including ethyl methyl ketone, isobutyl methyl ketone, methyl n-propyl ketone, n-propyl acetate, n-butyl acetate, iso-butyl acetate, sec-butyl acetate and diethyl carbonate. These solvents are capable of being protonated by a strong acid and as such are considered "weakly basic organic solvents."

The time for achieving optimum yields by the process according to the invention varies according to the particular solvent and temperature employed. The rearrangements are conveniently carried out at the boiling point of the chosen solvent and, for those solvents boiling in the lower part of the ranges quoted above, correspondingly longer reaction times, e.g. up to 48 hours, may be required than for those solvents boiling at higher temperatures. For example, rearrangements in dioxane generally require times of 7–15 hours to achieve optimum results whereas those carried out in methyl isobutyl ketone generally require times of 1–8 hours. The yields in the rearrangements are dependent, but to a lesesr extent, on the concentration of the catalyst in the solvent, correspondingly longer reaction times being required for lower concentrations of catalyst.

We particularly prefer to use dioxane as the organic solvent since penicillanic acid sulfoxides can be dissolved in this solvent in high concentration and in general there is no falling off of yield with increase of concentration up to concentrations of the order of 35%.

The quantity of the strong acid used in the rearrangement should not generally exceed 1.0 mole per mole of the penicillanic acid sulfoxide; however, we generally prefer to use it in proportions of from 0.05 to 0.5 mole per mole of penicillanic acid sulfoxide.

The quality of the nitrogenous base used in the rearrangement should not generally exceed 1.0 mole per mole of the penicillanic acid sulfoxide; however, we generally prefer to use it in proportions of from 0.025 to 0.25 mole per mole of penicillanic acid sulfoxide.

The appropriate time interval for any particular reaction may be determined by testing the reaction solution by one or more of the following procedures:

(1) Thin layer chromatography, for example on silica gel, developing with 3:1:1 n-butanol-acetic acid-water system and rendering the spots visible by treatment with a sulfuric acid spray.

(2) Determination of the rotation after suitable dilution of the reaction mixture with, for example, chloroform.

(3) Determination of the ultraviolet spectrum of a sample of the reaction mixture suitably diluted with ethyl alcohol. This determination cannot be adapted when ketonic solvents are used as the reaction media.

(4) NMR (nuclear magnetic resonance).

Although satisfactory yields can be obtained by carrying out the reaction under normal reflux, it may be possible to improve the yields by inserting a desiccating agent (e.g. alumina, calcium oxide, sodium hydroxide or molecular sieves) which is inert to the solvent in the reflux return line to remove water formed during the reaction. Alternatively, the water formed during the reaction may be removed by the use of a fractionating column the water formed being removed by fractional distillation.

The procedures set forth herein thus provide an improved process for the preparation of the valuable antibacterial agent cephalexin as noted above and completely avoid the numerous steps necessary when the cephalosporin nucleus is obtained originally by direct fermentation of cephalosporin C followed by removal of the side-chain, reacylation and, at some point, hydrogenation of 3-acetoxymethyl to 3-methyl. In addition, yields in the thermal rearrangement are higher than with the free acid of Gottstein et al.

The following examples will serve to illustrate this invention without limiting it thereto. All temperatures are given in degrees centigrade. "Skellysolve B" is a petroleum ether fraction of B.P. 60–68° C. consisting essentially of n-hexane.

DESCRIPTION OF THE PREFERRED EMBODIMENTS

Example 1

Diphenylmethyl 6β-(D-2,2-dimethyl-3-nitroso-5-oxo-4-phenyl-1-imidazolidinyl)-penicillanate sulfoxide (2).—

The starting material, nitrosohetacillin sulfoxide (1) was prepared by the procedure of Gottstein et al. comprising nitrosation of hetacillin followed by periodate oxidation to the sulfoxide.

A soltuion of 12 g. (0.028 mole) of nitrosohetacillin sulfoxide (1) and 7 g. (0.036 mole) of diphenyldiazomethane [J. B. Miller, J. Org. Chem., 24, 560 (1959)] in 400 ml. of ethyl acetate was stirred at room temperature for 3 hours. The reaction mixture was washed successively with water, a satd. $NaHCO_3$ solution, water, 5% HCl, water and finally with a satd. NaCl solution, and dried with anhydrous $Na_2SO_4$. The filtrate was evaporated to dryness under reduced pressure below 40°. The residual oil was triturated with ether-n-hexane to give 15.3 g. (92%) of the desired ester diphenylmethyl 6β-(D-2,2-dimethyl-3-nitroso-5-oxo-4 - phenyl - 1 - imidazolidinyl)-penicillanate sulfoxide (2) melting at 115–120°.

IR (KBr, cm.$^{-1}$): 1800 (β-lactam C=O), 1740 and 1720 (ester C=O and imidazolidinyl C=O).

NMR (DMSO-d$_6$, p.p.m.): 0.98 (3H, s., C$\underline{H}_3$), 1.47 (3, s., C$\underline{H}_3$), 2.04 (3H, s., C$\underline{H}_3$), 2.08 (3H, s., C$\underline{H}_3$), 4.58 (1H, s., C-3H), 4.78 (1H, d., 4 Hz., C–5H), 5.65 (1H, s., C$_6$H$_5$C$\underline{H}$-N), 5.66 (1H, d., 4 Hz., C–6H), 6.85 (1H, s., CO$_2$C$\underline{H}$Ph), 7–7.5 (15H, m., arom-H).

Example 2

Diphenylmethyl 7β-(D-2,2-dimethyl-3-nitroso-5-oxo-4-phenyl-1-imidazolidinyl)-3-methyl-3-cephem-4 - carboxylate (3).—(a) Thermal rearrangement of diphenylmethyl 6β-(D-2,2-dimethyl-3-nitroso-5-oxo-4 - phenyl - 1 - imidazolidinyl)-penicillanate sulfoxide (2) with monopyridinium dichloromethanephosphonate in dioxane: A stirred solution of 2.4 g. (4 mmoles) of diphenylmethyl 6β-(D-2,2-dimethyl-3-nitroso-5-oxo-4-phenyl - 1 - imidazolidinyl) penicillanate sulfoxide (2) and 0.49 g. (2 mmoles) of monopyridinium dichloromethanephosphonate [Glaxo Labs., Japan '72—10,394, Mar. 28, 1972 (Brit. appl. Mar. 11 and Sept. 22, 1969); Belgium 747,119 and 747,120 (Farmdoc 67,316R and 67,317R)] in 20 ml. of dry dioxane was refluxed for 2 hr. in the presence of molecular sieves (5 g.). The reaction mixture was evaporated to dryness under reduced pressure and the residue was dissolved in 200 ml. of ethyl acetate. The solution was washed successively with water, a satd. $NaHCO_3$ solution, water, 5% HCl, water and finally with a satd. NaCl solution, and dried with anhydrous $Na_2SO_4$. After treatment with active carbon, the filtrate was evaporated under reduced pressure below 40° and the residue triturated with ether-n-hexane (50 ml.–300 ml.) to give 1.9 g. (82%) of the desired cephalosporin ester diphenylmethyl 7β-(D-2,2-dimethyl-3-nitroso-5-oxo-4-phenyl - 1 - imidazolidinyl) - 3-methyl-3-cephem-4-carboxylate (3), M.P. 125–130° decompsn. The IR and NMR spectra were identical with the spectra of authentic diphenylmethyl 7β-(D-2,2-dimethyl-3-nitroso-5-oxo-4-phenyl-1-imidazolidinyl)-3 - methyl - 3-cephem-4-carboxylate (3) prepared by esterification of nitrosohetacephalexin (4).

(b) Thermal rearrangement of diphenylmethyl 6β-(D-2,2-dimethyl-3-nitroso-5-oxo-4-phenyl-1 - imidazolidinyl) penicillanate sulfoxide (2) with p-toluenesulfonic acid in tetramethylurea: A solution of 2.4 g. (4 mmoles) of diphenyl 6β-(D-2,2-dimethyl-3-nitroso-5-oxo-4-phenyl - 1-imidazolidinyl)-penicillanate sulfoxide (2) and 500 mg. of toluenesulfonic acid in 25 ml. of tetramethylurea was heated at 135° for 2 hours in the presence of 5 g. of molecular sieve under stirring. The colored reaction mixture was evaporated at 40° at 1 mm. Hg and the residue was dissolved in 200 ml. of ethyl acetate. The ethyl acetate solution was worked up in the same manner as described in (a) to give 1.26 g. (54%) of diphenylmethyl 7β-(D-2,2-dimethyl-3-nitroso-5-oxo-4-phenyl-1 - imidazolidinyl)-3-methyl-3-cephem-4-carboxylate (3) which was identical with an authentic sample.

(c) Thermal rearrangement of diphenylmethyl 6β-(D-2,2-dimethyl-3-nitroso-5-oxo-4-phenyl - 1 - imidazolidinyl) penicillanate sulfoxide (2) with acetic anhydride in dimethylformamide: A solution of 2.4 g. (4 mmoles) of diphenylmethyl 6β-(D-2,2-dimethyl-3-nitroso - 5 - oxo - 4-phenyl-1-imidazolidinyl)penicillanate sulfoxide (2) and 2.5 g. of acetic anhydride in 50 ml. of dimethyl formamide (DMF) was heated at 130° for 1 hour under stirring. The colored reaction mixture was evaporated at 40° at 5 mm. Hg and the residue dissolved in 200 ml. of ethyl acetate. The ethyl acetate solution was worked up in the manner described in (a) to give 1.5 g. (64%) of diphenylmethyl 7β-(D-2,2-dimethyl-3-nitroso-5 - oxo - 4-phenyl-1-imidazolidinyl)-3-methyl-3-cephem - 4 - carboxylate (3) which was identical with an authentic sample.

(d) Esterification of nitrosohetacephalexin (4): A solution of 292 mg. (0.7 mmole) of 7β-(D-2,2-dimethyl-3-nitroso-5-oxo-4-phenyl-1-imidazolidinyl) - 3 - methyl - 3-cephem-4-carboxylic acid (4) (which was prepared from cephalexin according to the procedure of Gottstein et al.) and 200 mg. (1.1 mmoles) of diphenyldiazomethane for 2 hours. The reaction mixture was washed successively with a satd. $NaHCO_3$ solution, water, 5% HCl, water and finally with a satd. NaCl solution. After drying with anhydrous $Na_2SO_4$, the solvent was evaporated in vacuo below 40° to afford an oily residue, which was triturated with ether-n- hexane to give 265 mg. (65%) of the cephalosporin ester diphenyl methyl 7β-(D-2,2-dimethyl-3-nitroso-5 - oxo - 4-phenyl-1-imidazolidinyl)-3-methyl-3-cephem-4 - carboxylate (3), M.P. 125–130° decompsn.

IR (KBr, cm.⁻¹): 1790 (β-lactam C=O), 1720 (ester C=O and imidazolidinyl C=O).
NMR (CDCl$_3$, p.p.m.): 1.98 (3H, s., C$\underline{H}_3$), 2.02 (3H, s., C$\underline{H}_3$), 2.23 (3H, s., C=C—C$\underline{H}_3$), 2.67 (1H, d., 17 Hz., C-2$\underline{H}$), 3.58 (1H, d., 17 Hz., C-2$\underline{H}$), 4.92 (1H, d., 4 Hz., C-6H), 5.03 (1H, d., 4 Hz., C-7H), 5.48 (1H, s., C$_6$H$_5$-C$\underline{H}$-N), 6.94 (1H, s., CO$_2$C$\underline{H}$Ph), 7.1–7.5 (15H, m., arom-H).

Example 3

7β-(D-2,2-dimethyl-2-nitroso-5-oxo-4-phenyl - 1 - imidazolidinyl)-3-methyl-3-cephem-4 - carboxylic acid (4).—

To a solution of 1.17 g. (2 mmoles) of diphenylmethyl 7β-(D-2,2-dimethyl-2-nitroso-5-oxo-4-phenyl-1 - imidazolidinyl)-3-methyl-3-cephem-4-carboxylate (3) in 1 ml. of anisole was added at 0° 3 ml. of trifluoroacetic acid (TFA) and the mixture stirred at 5–10° for 5 minutes. To the brown-colored reaction mixture was added 100 ml. of ether to separate 285 mg. of the crude 7β-(D-2,2-dimethyl-3-nitroso-5-oxo-4-phenyl - 1 - imidazolidinyl) - 3-cephem-4-carboxylic acid (4) which was collected by filtration. The second crop (412 mg.) was obtained from the filtrate by concentration of it in vacuo to 20 ml. of followed by addition of 200 ml. of n-hexane. The first and second crops were combined and washed thoroughly with 30 ml. of ether to give 550 mg. (66%) of the desired product 7β-(D-2,2-dimethyl-3-nitroso-5-oxo-4-phenyl-1 - imidazolidinyl)-3-methyl-3-cephem-4 - carboxylic acid (4), M.P. 170–180°, TLC R$_f$ 0.35 (silica gel, solv. EtOH), which was identical (TLC and the mixed melting point) with the authentic 7β-(D-2,2-dimethyl-2-nitroso-5-oxo-4-phenyl-1-imidazolidinyl)-3-methyl-3-cephem - 4 - carboxylic acid (4) prepared from cephalexin.

This 7β-(D-2,2-dimethyl-3-nitroso-5-oxo-4 - phenyl - 1-imidazolidinyl)-3-methyl-3-cephem-4-carboxylic acid (4) was converted to cephalexin by the procedure described by Gottstein et al.

We claim:
1. Diphenylmethyl 7β-(D-2,2-dimethyl-3-nitroso-5-oxo-4-phenyl-1-imidazolidinyl)-3-methyl-3 - cephem - 4 - carboxylate.

References Cited

UNITED STATES PATENTS 3,714,146  1/1973  Gottstein et al. _____ 260—243 C

FOREIGN PATENTS 270,863  5/1969  Austria _____ 260—243 C

NICHOLAS S. RIZZO, Primary Examiner

R. D. McCLOUD, Assistant Examiner

U.S. Cl. X.R.

260—239.1